May 17, 1955  J. R. GENSHEIMER  2,708,351
FLEXIBLE COUPLING
Filed Nov. 10, 1952

Inventor
Joseph R. Gensheimer
By Ralph Hammar
Attorney

United States Patent Office 2,708,351
Patented May 17, 1955

2,708,351

FLEXIBLE COUPLING

Joseph R. Gensheimer, Erie, Pa., assignor to Lord Manufacturing Company, Erie, Pa., a corporation of Pennsylvania Application November 10, 1952, Serial No. 319,623

2 Claims. (Cl. 64—11)

This invention is intended to provide a flexible coupling which can also include a drive pulley. Such couplings are useful in domestic washing machines where the pulley drives a pump.

Figure 2:
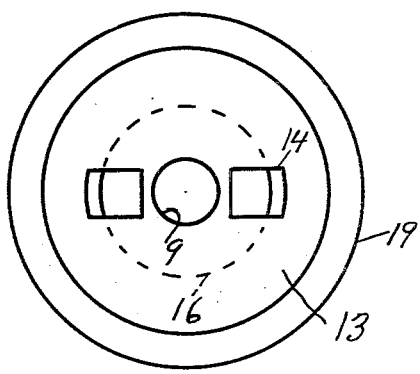
Figure 1:
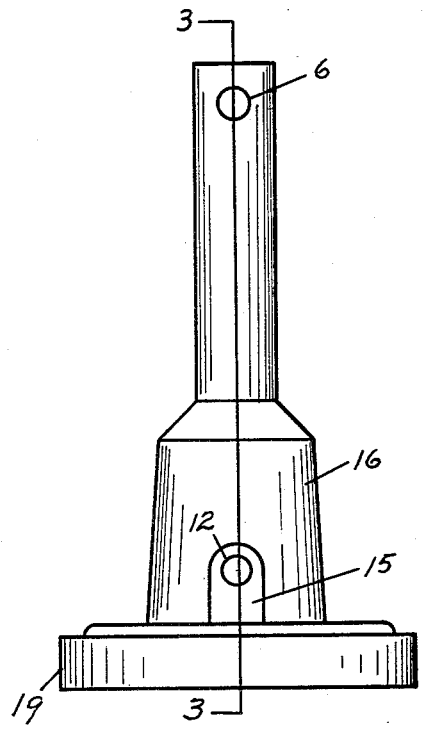
Figure 3:
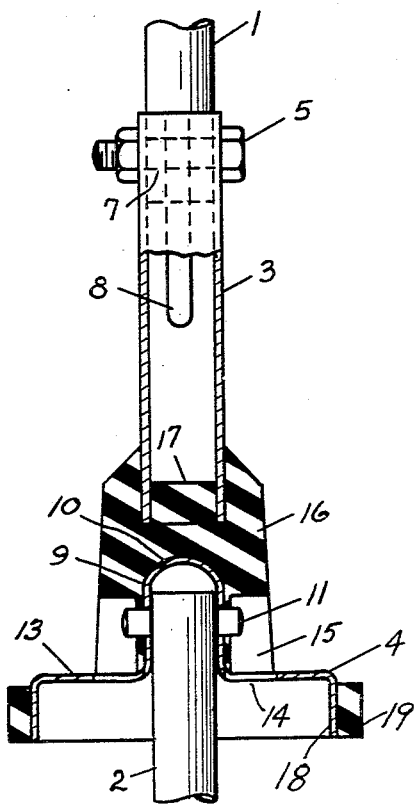

In the drawing, Fig. 1 is a side view of a coupling; Fig. 2 is an end view; and Fig. 3 is a section on line 3—3 of Fig. 1.

In the drawing, 1 and 2 indicate shafts to be connected by a flexible coupling. One of these shafts will be the driving and the other the driven shaft. The coupling comprises axially spaced driving and driven members 3 and 4. The tubular coupling member 3 telescopes over the shaft 1 and is fastened thereto by a bolt 5 extending through diametrically opposite openings 6 in the member 3 and an aligned opening 7 in the shaft. The outer end of the coupling member 3 is slotted at 8 so that it can be tightly clamped against the outer surface of the shaft 1 when the bolt 5 is tightened. The coupling member 4 has a cup-shaped portion 9 with a bottom 10 axially spaced from and presented to the coupling member 3. The cup-shaped portion 9 fits over the shaft 2 and the driving connection to the shaft is made by a fastening pin 11 extending through diametrically opposite openings 12 in the side walls of the cup. At the rim of the cup 9 there is an outwardly extending flange 13 having diametrically opposite core receiving openings 14 at the outer surface of the cup. The core receiving openings are in line with axially extending notches 15 in a body 16 of rubberlike material and bonded to the coupling members 3 and 4. As shown, the body 16 surrounds and embeds the outer surface of the coupling member 3 and has a portion 17 extending into the bore of the member 3. The body 16 also surrounds and is bonded to the outer surface of the cup 9 and has its end bonded to the adjacent surface of the flange 13.

By having the core receiving openings 14 in the flange in line with the notches 15, the molding of the coupling is simplified. One of the coupling parts 4 can be loaded into a mold having cores projecting through the openings 14 which serve to align the coupling member and also to form the notches 15. The mating part of the mold can carry the coupling member 3 and have the cavity forming the outer surface of the body 16. The mold can part along the surface of the flange 13 to which the rubber is bonded thereby eliminating the need for any retractable cores. After the coupling is molded, the holes 12 can be drilled through the side walls of the cup thereby providing access for the fastening pin 11.

By providing the outer part of the flange 13 with a rim 18 to which is bonded a band 19 of rubberlike material a drive pulley can be provided which is easily molded at the same time that the coupling is molded. This is useful in washing machine drives where the pump can be driven from the pulley.

What I claim as new is:

1. In a flexible coupling, axially spaced driving and driven members, one of which has a tubular shaft receiving socket member and an outwardly extending flange on one end of the socket member, a body of rubberlike material between and bonded to the members and surrounding said tubular shaft receiving socket member and forming a flexible driving connection between said members, said flange having diametrically opposite openings extending from the outer surface of the body to the outer surface of the socket member for receiving axially extending cores, said body having diametrically opposite axially extending notches in line with the openings in the flange and extending radially inward from the outer surface of the body to the outer surface of the socket member and providing access for a fastening extending diametrically across the tubular shaft receiving socket member.

2. The coupling of claim 1 in which the flange has a rim at the outer part and a band of rubberlike material bonded to the rim and providing a drive pulley.

References Cited in the file of this patent

UNITED STATES PATENTS 2,586,567      Scheele _____ Feb. 19, 1952